Patented July 10, 1923.

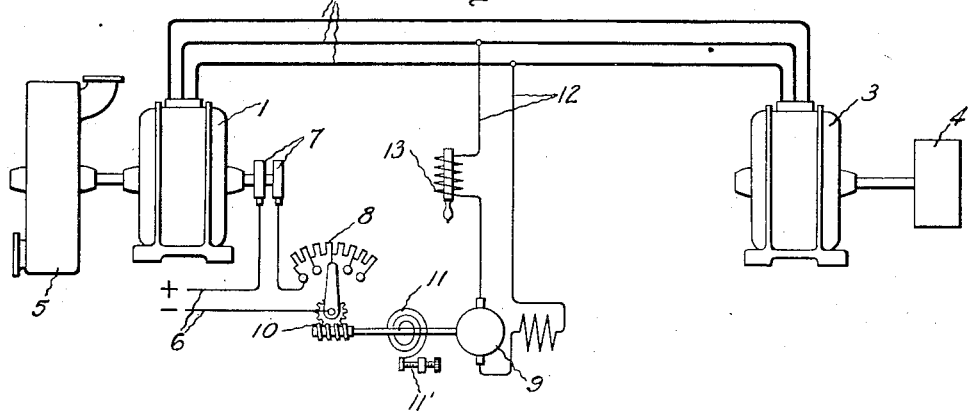
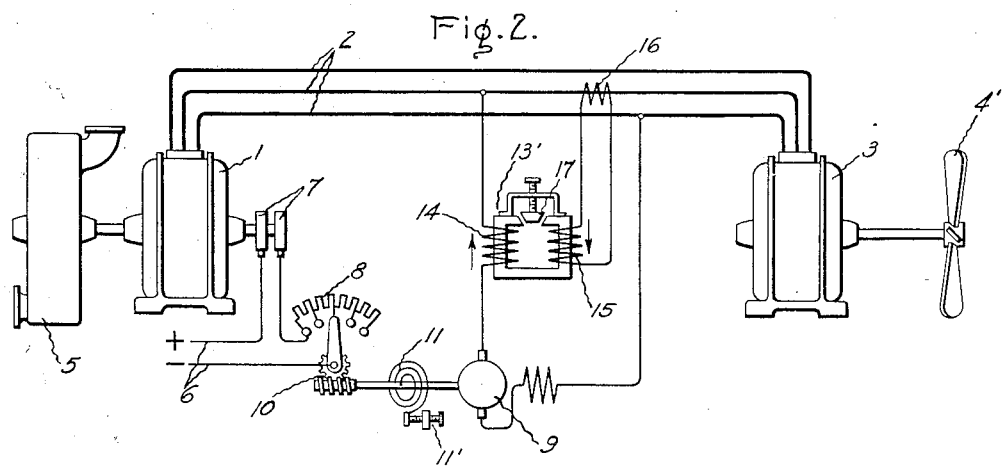

1,461,575

UNITED STATES PATENT OFFICE.

FREDERIC H. CLOUGH, OF HILLMORTON, NEAR RUGBY, ENGLAND, ASSIGNOR TO GENERAL ELECTRIC COMPANY, A CORPORATION OF NEW YORK.

SHIP-PROPULSION SYSTEM.

Application filed November 8, 1920, Serial No. 422,630. Renewed May 10, 1923.

*To all whom it may concern:*

Be it known that I, FREDERIC H. CLOUGH, a subject of the King of Great Britain, residing at Hillmorton, near Rugby, England, have invented certain new and useful Improvements in Ship-Propulsion Systems, of which the following is a specification.

My invention relates to electric power systems wherein an adjustable speed generator of the synchronous type is arranged to supply energy to a work motor, and is particularly adapted to systems in which the load on the motor varies at a comparatively slow rate, as in electric ship propulsion systems. An object of my invention is to provide improved means for controlling the excitation of such systems in accordance with the requirements of the load.

My invention will be better understood from the following description taken in connection with the accompanying drawing, and its scope will be pointed out in the appended claims.

Fig. 1 of the drawing diagrammatically represents an electric power system comprising means for regulating the generator excitation in accordance with the requirements of a work motor; and Fig. 2 diagrammatically represents a ship propulsion system comprising a modified connection of the excitation regulating means.

In Fig. 1 a synchronous generator 1 is connected through the mains 2 to supply a motor 3 arranged to drive a load 4. The adjustable speed prime mover 5 is diagrammatically represented as a turbine. The exciting current for the generator 1 is supplied from the direct current mains 6 to the slip rings 7. A rheostat 8 is provided to control the field strength of the generator and this rheostat is here shown in series with the generator field winding. A series commutator type torque motor 9 is connected through any suitable mechanism indicated by the gearing 10 to operate the rheostat 8. A spring 11 is arranged to oppose the operation of the torque motor 9 and any suitable means 11' is provided for adjusting the effect of the spring. The torque motor 9 is connected by the leads 12 across the mains 2 so that the torque motor is responsive to the voltage of the generator. While a single phase motor 9 has been shown, it is obvious to those skilled in the art that the motor may be polyphase if desired. An adjustable reactor 13' is provided in the circuit of the motor 9 substantially to compensate for any tendency of the current through the torque motor to change with changes in generator voltage due to changes in speed, as will be hereinafter set forth more fully in connection with the operation of the system. While Fig. 1 shows the torque motor arranged to control a rheostat in the excitation circuit, it is obvious to those skilled in the art that the torque motor may control any equivalent means for controlling the strength of the generator excitation. The torque motor 9 is designed to have a small moment of inertia and to have a torque that is large compared to the frictional load of the rheostat.

The operation of the system shown in Fig. 1 is substantially as follows: With any given speed of the turbine driven generator 1, the voltage of the mains 2 will tend to vary with the load on the work motor 3. The current through the torque motor 9 will be proportional to the voltage of the generator and the torque motor will therefore operate to vary the excitation of the generator to maintain the voltage of the generator substantially constant with varying load on the work motor. If the load increases the voltage will tend to fall. This will cause the current through the torque motor to be reduced and consequently the torque will also decrease and the spring 11 will cause the motor to rotate through a small angle and in doing so the rheostat resistance 8 will be reduced and the voltage restored substantially to its former value. Conversely, if the voltage tends to rise the motor torque will increase and overpower the spring to insert more resistance in the alternator field to restore the voltage to its former value. If the speed of the generator is increased by increasing the speed of the turbine the voltage of the generator will rise substantially in proportion to the speed. If the reactor 13 were not provided the torque motor 9 would reduce the generator excitation to prevent this rise in voltage. It is, however, desirable to permit the generator voltage to rise with increased speed for the reason that more current is required by the work motor 3 at its increased speed of rotation, and in order to permit this rise in voltage I provide the reactor 13, the reactance of which increases with an increase in generator speed and frequency. The reactor acts to maintain the current through the torque motor substantially constant for changes in line voltage due to changes in generator speed. An increase in generator voltage due to an increase in speed therefore causes no operation of the torque motor. The voltage at any given speed, however, may be adjusted by adjusting either the spring 11 or reactor 13.

Referring to Fig. 2, an electric ship propulsion system is illustrated in which the turbine, generator, work motor and torque motor are identical with the arrangement shown in Fig. 1. The work motor 3 in this case is however arranged to drive a ship propeller 4' and the adjustable reactor 13' is modified to cause the generator excitation to be varied in accordance with the current supplied to the work motor to give a compounding effect to the generator excitation regulating means. The reactor 13' is provided with a coil 14 in the circuit of motor 9 which coil tends to function exactly as the reactor 13 of Fig. 1. The reactor 13' is however in this case provided with an additional coil 15 supplied from a current transformer 16 in one of the mains 2 so that the current in coil 15 varies with the load on the propeller driving motor. The coils 14 and 15 are connected to the generator mains 2 so that the currents in coils 14 and 15 are substantially in phase, and the coils 14 and 15 are so arranged that the choking effect of the reactor is increased with an increase of current through the coil 15 and decreased with a decrease in this current. This is shown in the drawing by the arrows alongside coils 14 and 15 which indicate that these coils tend to send flux through the core of the reactor in the same direction. The adjustability of the reactor 13' is indicated by showing the core member 17 as adjustable in position.

The operation of the ship propulsion system shown in Fig. 2 is substantially as follows: With any given speed of the generator an increase of load upon the work motor 3 produces an increase of current through the coil 15 of the reactor 13' thereby increasing the reactance of the reactor and reducing the current through the torque motor 9. This causes an operation of the rheostat to increase the generator field excitation and raise the voltage of the generator in proportion to the increased load on the motor. A decrease of load on the work motor decreases the current through coil 15, reduces the reactance of the reactor 13' and thereby increases the current through the torque motor 9, thus causing an operation of the regulator to reduce the generator excitation and voltage. Variations in load on the work motor at any given speed of the generator may be due to headwinds or other causes. The pitching of the ship produces variations in load on the propeller driving motor due to the propeller coming out of the water in a heavy sea. These pitching movements usually have a period of about seven seconds and the apparatus operates sufficiently rapidly to adjust the alternator voltage in accordance with such load variations. In an electrically propelled ship the speed of the ship is varied by varying the speed and frequency of the turbine driven generator 1, and it is desirable that the voltage of the generator rise with the increased speed of the generator for the reason that the load on the propeller motor increases rapidly with increase in speed. On such an increase in speed with the arrangement shown in Fig. 2, the increase of reactance of the coil 14 tends to prevent any change in the current through the pilot motor 9 due merely to the increase in generator speed. This allows the generator voltage to rise with increased speed just as in the arrangement shown in Fig. 1. In Fig. 2 however the voltage increases at a greater rate than in Fig. 1, by reason of the action of coil 15, the current through which increases in proportion to the increased load imposed on the propeller driving motor by reason of the increase in the speed of the ship. The increased effect of coil 15 as heretofore pointed out causes the torque motor to operate to increase the generator excitation. In order to adjust the generator voltage, for instance, while the ship is maneuvering, the spring 11 or the reactor 13' may be adjusted. It is apparent that the heavy current, which the motor takes during maneuvering, as, for example, when accelerating the ship, strongly increases the generator excitation. The motor is thus prevented from falling out of step when the load is heavy, and the efficiency and capacity of the plant are increased by reason of the reduced heating of the generator field winding during periods of light load.

Where the motors are of the synchronous type, it is obvious to those skilled in the art that it is possible to apply the excitation regulating means to the motor field winding, since the maximum torque of the motor may then be adjusted by controlling the excitation of either the generator or the motor.

In accordance with the provisions of the Patent Statutes, I have described the principle of operation of my invention together with the apparatus which I now consider to represent the best embodiment thereof, but it is apparent that modifications and variations of the apparatus are possible within the spirit of my invention, and I, therefore, aim to cover all such modifications and variations as fall within the scope of my invention which is defined in the appended claims.

What I claim as new and desire to secure by Letters Patent of the United States, is:—

1. In an electric power system an adjustable speed generating machine of the synchronous type, a load driving dynamo electric machine supplied thereby, and means for controlling the excitation strength of one of said machines comprising a series commutator type torque motor connected to respond to generator voltage and a reactor in circuit with said torque motor substantially to compensate any tendency of the current through said torque motor to change with changes in generator voltage due to changes in speed.

2. In an electric power system an adjustable speed synchronous generator, a work motor supplied thereby, a rheostat for controlling the generator excitation, a series commutator type motor connected in shunt to said generator for operating said rheostat in one direction, spring means for opposing the operation of said commutator motor, said commutator motor having a small moment of inertia and being capable of producing a torque that is large compared to the frictional load of the rheostat, a reactor in circuit with said torque motor to compensate any tendency of the current through said commutator motor to change with changes in generator voltage due to changes in speed, and means whereby the generator voltage at any given speed may be adjusted.

3. In an electric power system an adjustable speed synchronous generator, a work motor supplied thereby, means for controlling the strength of the generator excitation comprising a series commutator type torque motor connected to respond to generator voltage, a reactor in circuit with said torque motor to compensate any tendency of the current through said torque motor to change with changes in generator voltage due to changes in speed, and means for changing the compensating effect of said reactor in response to changes in load on said work motor.

4. An electric ship propulsion system comprising an adjustable speed synchronous generator, a propeller, a propeller driving motor connected to the generator mains, and means for controlling the strength of the generator excitation comprising a series commutator type motor connected across the generator mains, a reactor in series with said commutator motor and means for changing the reactive effect of the reactor in accordance with changes in the current supplied to the propeller driving motor to increase the reactive effect with increases in motor current and decrease the reactive effect with decreases in motor current.

In witness whereof, I have hereunto set my hand this thirteenth day of October, 1920.

FRED H. CLOUGH.

Witnesses:
J. A. FOSTER,
DOROTHY WHITE.